US008155585B2

(12) United States Patent
Huynh (10) Patent No.: US 8,155,585 B2
(45) Date of Patent: *Apr. 10, 2012

(54) SYSTEM AND METHOD FOR BLOCKING DEVICES FROM A CARRIER NETWORK

(75) Inventor: Tran Hoang Huynh, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,380

(22) Filed: Feb. 22, 2011

(65) Prior Publication Data

US 2011/0143659 A1    Jun. 16, 2011

Related U.S. Application Data

(63) Continuation of application No. 11/937,754, filed on Nov. 9, 2007, now Pat. No. 7,917,085.

(51) Int. Cl.
*H04W 12/00* (2009.01)

(52) U.S. Cl. .................. 455/26.1; 455/411; 455/432.3; 455/435.1; 455/434

(58) Field of Classification Search .............. 455/411, 455/26.1, 432.3, 435.1, 434, 420, 432.1, 455/9, 515, 565, 410, 419; 370/235, 329, 370/338, 352, 400, 328, 389; 709/206, 207, 709/223, 224, 229; 726/13, 224; 713/200; 717/174

See application file for complete search history.

(56) References Cited

U.S. PATENT DOCUMENTS

| 7,194,507 | B2 * | 3/2007 | Sato et al. .................. 709/203 |
| 7,293,282 | B2 * | 11/2007 | Danforth et al. ............... 726/4 |
| 7,919,085 | B2 * | 4/2011 | Bensussan et al. ........ 424/130.1 |
| 2004/0198319 | A1 * | 10/2004 | Whelan et al. ............... 455/411 |
| 2005/0005154 | A1 * | 1/2005 | Danforth et al. ............. 713/200 |
| 2009/0254678 | A1 * | 10/2009 | Gross ........................... 709/248 |
| 2011/0116442 | A1 * | 5/2011 | Caldwell et al. ............. 370/328 |

OTHER PUBLICATIONS

U.S. Appl. No. 11/937,754, filed Nov. 9, 2007.

* cited by examiner

*Primary Examiner* — Tan Trinh
(74) *Attorney, Agent, or Firm* — Perry+Currier Inc.

(57) ABSTRACT

There is disclosed a system and method for blocking a device from a carrier network. In an embodiment, the method comprises defining an unauthorized combination filter including one or more device parameters; attaching the unauthorized combination filter to a carrier; comparing the device parameter values in the unauthorized combination filter to device parameter values stored in the device; and if the device parameter values stored in the device match the device parameter values in the unauthorized combination filter, then blocking the device from accessing the carrier network. The device parameter values stored in the device may include one or more of a device type value, a device operating system version value, and a device application version value, and the method further comprises comparing these one or more values to corresponding device parameter values defined in the unauthorized combination filter. The unauthorized combination filter may be attached to a carrier by providing a carrier identifier.

19 Claims, 6 Drawing Sheets

SYSTEM AND METHOD FOR BLOCKING DEVICES FROM A CARRIER NETWORK

CROSS-REFERENCE TO RELATED APPLICATION

This application is a continuation of U.S. patent application Ser. No. 11/937,754, filed Nov. 9, 2007, the contents of which is incorporated herein by reference.

FIELD OF THE INVENTION

The present invention relates generally to a system and method for blocking a device from a carrier network.

BACKGROUND

Suppliers of communication services may provide various types of services that may be offered to mobile handheld device subscribers on various carriers. Such services may include, for example, electronic mail (email), voice communications, instant text messaging, Internet browsing, music downloading, and various services that may become available with the introduction of a new communication device. With the addition of new types of services and features, it may be necessary to upgrade network software versions, which may make certain devices incompatible with certain carrier networks. A solution is required to effectively manage access to a carrier network for these devices.

DETAILED DESCRIPTION

As noted above, the present invention relates to a system and method for blocking a device from a carrier network.

Figure 1:
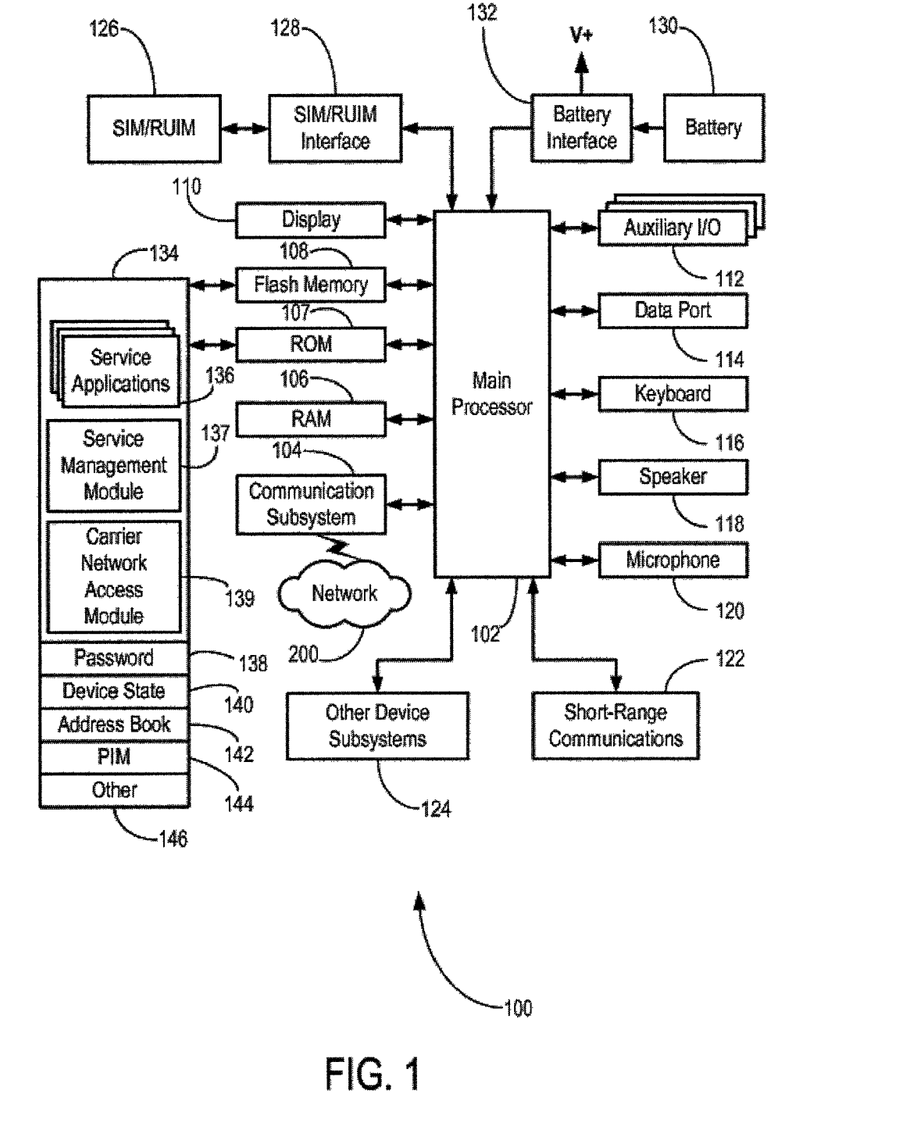
FIG. 1 is an illustration of a mobile handheld device in accordance with an embodiment.

Shown in FIG. 1 is a schematic block diagram of an illustrative mobile handheld device 100. The handheld device 100 may comprise a number of components, including a main processor 102 which controls the overall operation of device 100. Various communication functions, including data and voice communications, Internet browsing, instant text messaging, etc. may be performed through a communication subsystem 104 via wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The device 100 may be a battery-powered device and may include a battery interface 132 for receiving one or more rechargeable batteries 130 and for powering the various subsystems described above.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

Handheld device 100 may also include a read-only memory (ROM) 107 that may store a non-alterable electronic serial number or ESN which may be burned into ROM 107 at the time of manufacture of device 100. In addition, handheld device 100 may have a unique product identification number (PIN) stored in the ROM 107, or in another memory store in device 100.

The main processor 102, in addition to its operating system functions, enables execution of software applications 134 on the device 100. The software applications 134 may control various device features and services, and may be installed on the device 100 during its manufacture, or may be subsequently loaded onto the device 100 as a software update through one of the wireless network 200, the auxiliary I/O subsystem 112, the data port 114, the short-range communications subsystem 122, or another subsystem 124.

The software applications 134 may include, for example, various communication service modules 136 (e.g. email, instant text messaging, Internet browsing, music downloading, etc.), and a password approval module 138. The software applications 134 may also include a device service management module 137 for managing the service applications provisioned for device 100 on a carrier network. The handheld device 100 may also include a carrier network access module 139 that may be suitably adapted to manage access to a carrier network for the handheld device 100. Carrier network access module 139 will be described in more detail below. The handheld device 100 may further include a device state module 140, an address book 142, a personal information manager (PIM) 144, and various other modules 146.

Figure 2:
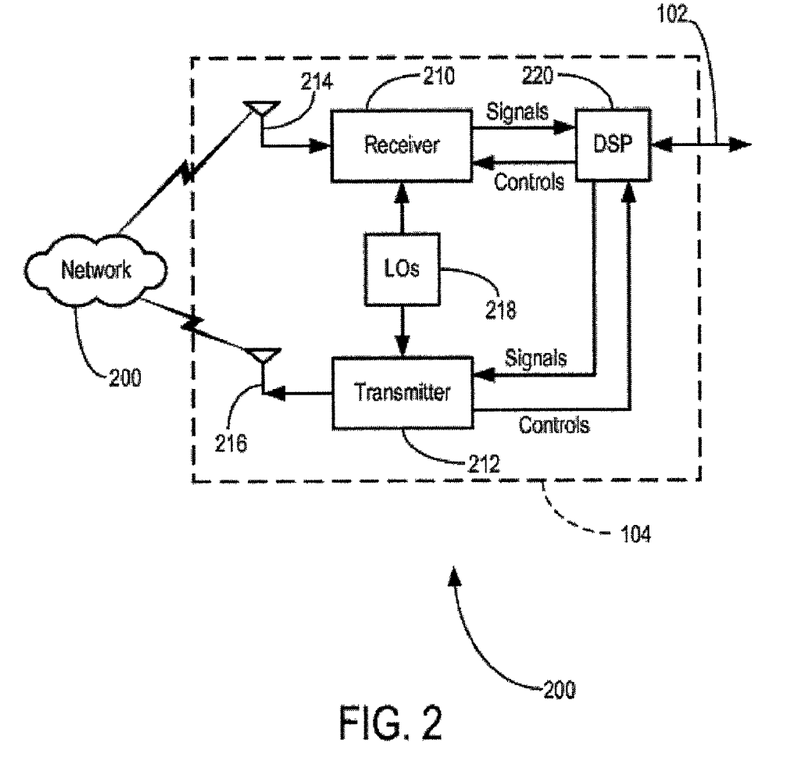
FIG. 2 is a schematic diagram of a communication subsystem component in the device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220.

Signals received by the antenna 214 through the wireless network 200 are input to the receiver 210, which can perform such common receiver functions as signal amplification, frequency down conversion, filtering, channel selection, and analog-to-digital (ND) conversion. ND conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216.

Figure 3:
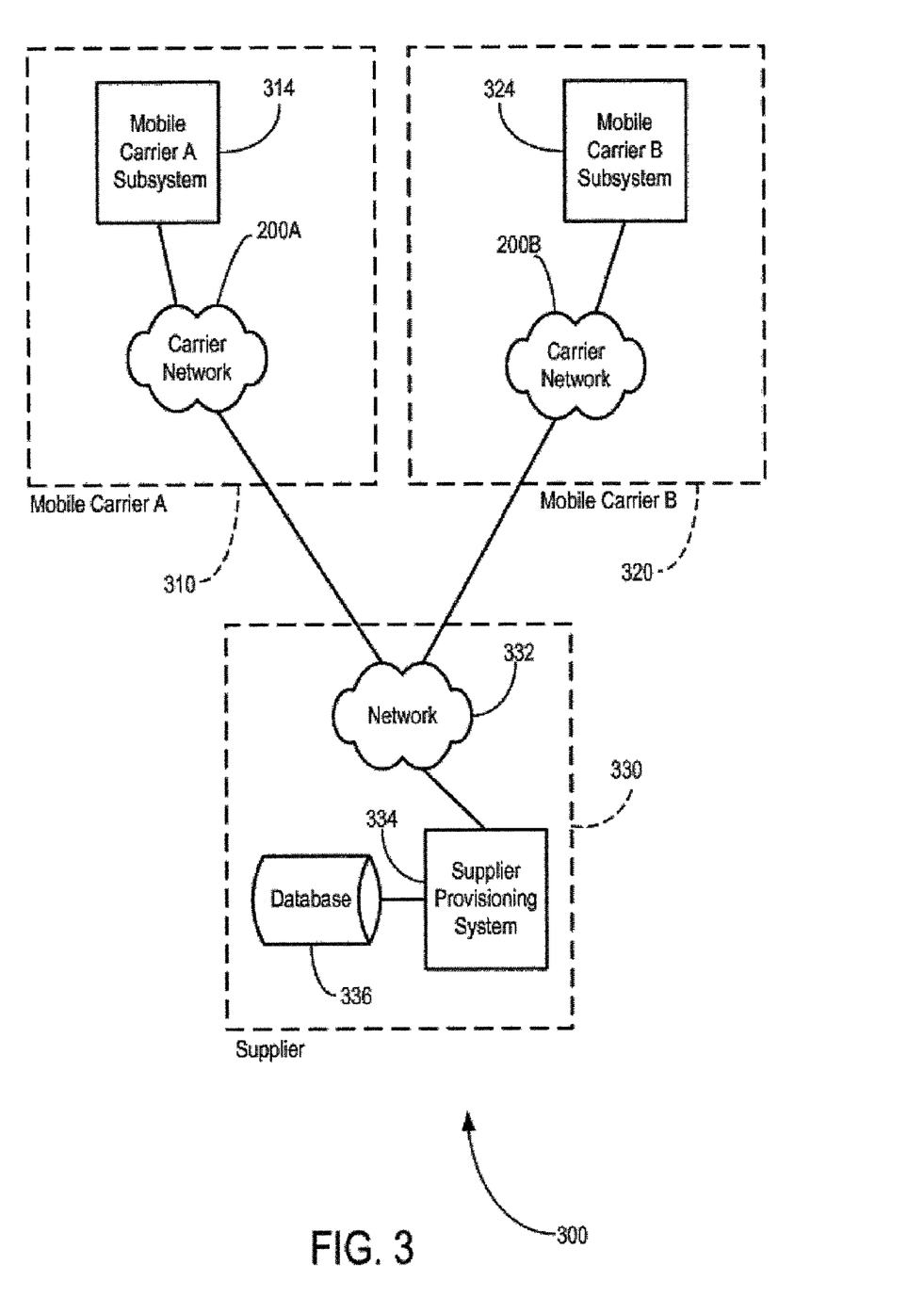
FIG. 3 is a schematic diagram of illustrative wireless networks.

Now referring to FIG. 3, shown is an illustrative schematic block diagram of wireless networks 200A, 200B of mobile carrier A 310 and mobile carrier B 320, respectively. With the various components and subsystems described above, device 100 may be configured to access various services available through wireless networks 200A and 200B. As shown, each of the wireless networks 200A, 200B may have subsystems 314, 324 for registering and provisioning various wireless services for devices 100 on their respective wireless networks 310, 320. The supplier 330 may offer various communication services via network connections to the supplier 330's own network 332. The communication services may include, for example, wireless email, voice communication, instant text messaging, Internet browsing, music downloading, and various other services to subscribers on wireless networks 200A, 200B.

The supplier 330's network 332 may connect to a provisioning system 334 maintained by the supplier 330 and which may be appropriately configured to interact with subsystems 314, 324 provided on each of the wireless networks 200A, 200B. If connected through the Internet, for example, the connections between provisioning system 334 and subsystems 314, 324 may be by way of XML, or a web services interface. With a suitable network connection, subsystems 314 and 324 may be configured to interact with the supplier 330's provisioning system 334 to request activation, deactivation, suspension or modification of a subscriber's services on their respective wireless networks 200A, 200B.

Provisioning system 334 may maintain a database 336 of services that have been provisioned for each of the devices 100 on the wireless networks 200A, 200B of mobile carrier A 310, and mobile carrier B 320. In the database 336 of provisioning system 334, each of the devices 100 may be uniquely identified, for example, by the unique ESN burned into the ROM 107 of each device 100. Alternatively, each device 100 may be uniquely identified by the unique PIN identifier stored in ROM 107, or in another memory store in device 100. Records in database 336 may contain the unique ESN or PIN retrieved from ROM 107 or another memory store on each device 100. Each device 100 may thus be uniquely recognized by the supplier's provisioning system 334. Records in database 336 may also store information for the owning mobile carrier (e.g. mobile carrier A 310, or mobile carrier B 320), and this information may be linked to the unique ESN or PIN of device 100.

In an embodiment, each device 100 may include a carrier network access module 139 (FIG. 1) which is adapted to store various device properties or parameters, such as device type, device operating system ("OS") version, and a device application version. Furthermore, the carrier network access module 139 may store a value indicating the carrier to which the device 100 is linked or assigned. As will be explained in more detail further below, these various device parameters or properties may be used individually or in combination to block a device 100 or a plurality of devices 100 from accessing a particular carrier network.

Figure 4A:
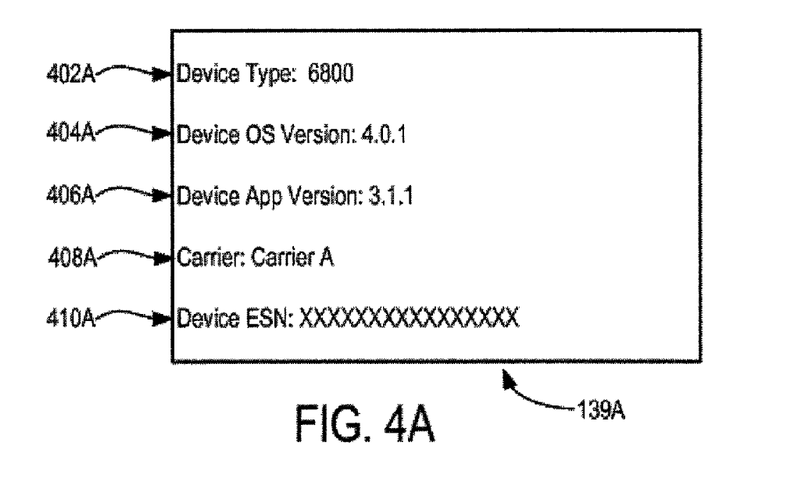
FIG. 4A and FIG. 4B show illustrative device parameter values stored in first and second devices.

Now referring to FIG. 4A, in an illustrative example, a first mobile handheld device 100A may have a carrier network access module 139A storing values for each device parameter, such as device type value 402A of "6800", a device OS version value 404A of "4.0.1", a device application value 406A of "3.1.1", and a carrier identifier 408A of "Carrier A". As shown, carrier network access module 139A may also have access to the device ESN value 410A retrieved from ROM 107 of device 100A.

Figure 4B:
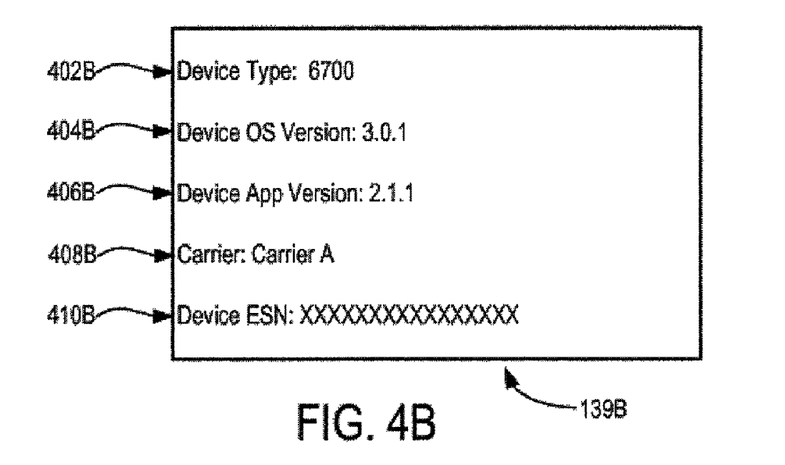

Now referring to FIG. 4B, in another illustrative example, a second mobile handheld device 100B may have a carrier network access module 139B storing values for each device parameter, such as a device type value 402B of "6700", a device OS version value 404B of "3.0.1", a device application version of "2.1.1", and a carrier identifier 408B of "Carrier A". As shown, carrier network access module 139B may also have access to the device ESN value 410B retrieved from ROM 107 of device 100B.

Figure 5:
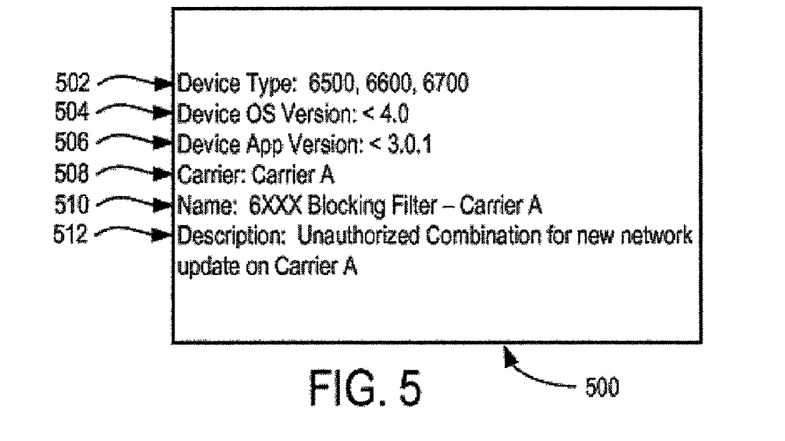
FIG. 5 shows a schematic diagram of a user interface for setting device parameter values for an unauthorized combination filter.

Now referring to FIG. 5, in an illustrative example, shown is a user interface that may be accessed by an administrator for defining an unauthorized combination filter 500 of device parameters that may be used to block a device or a plurality of devices from accessing carrier network 200A. The term "unauthorized combination" is used in the present disclosure to define device parameters for a group of devices to be blocked from a particular carrier network. More particularly, the device parameters may be a combination of a number of device parameters, including one or more of such device parameters as described above.

As illustrated in FIG. 5, each unauthorized combination filter 500 may include an unauthorized device type field 502, an unauthorized device OS version field 504, and an unauthorized device application version field 506. The regular expression fields in the unauthorized combination 500 are used to determine the group or class of devices to be blocked from a carrier as defined in carrier identifier 508.

Furthermore, each unauthorized combination filter 500 may include a name field 510 which contains a unique name for the unauthorized combination filter 500 (e.g. such as "6XXX Blocking Filter—Carrier A"), and which may be used to uniquely identify the unauthorized combination filter 500.

Optionally, a description field 512 may also be included to provide a more detailed description for the unauthorized combination filter 500, such as "Unauthorized combination for new network update on carrier A" in the current illustrative example. The unauthorized combination filter 500 thus defines a group or class of devices to be blocked, and may be attached to a carrier via carrier identifier 508. By mapping the unauthorized combination filter 500 to a carrier's unique identifier 508, the blocking mechanism may take affect.

While the above embodiments describe an example where the unauthorized combination filter 500 is attached to one carrier (e.g. carrier A), it will be appreciated that the unauthorized combination filter 500 may be attached to more than one carrier. As well, a carrier may have more than one unauthorized combination filter blocking more than one group or class of devices based on different filtering criteria.

Figure 6:
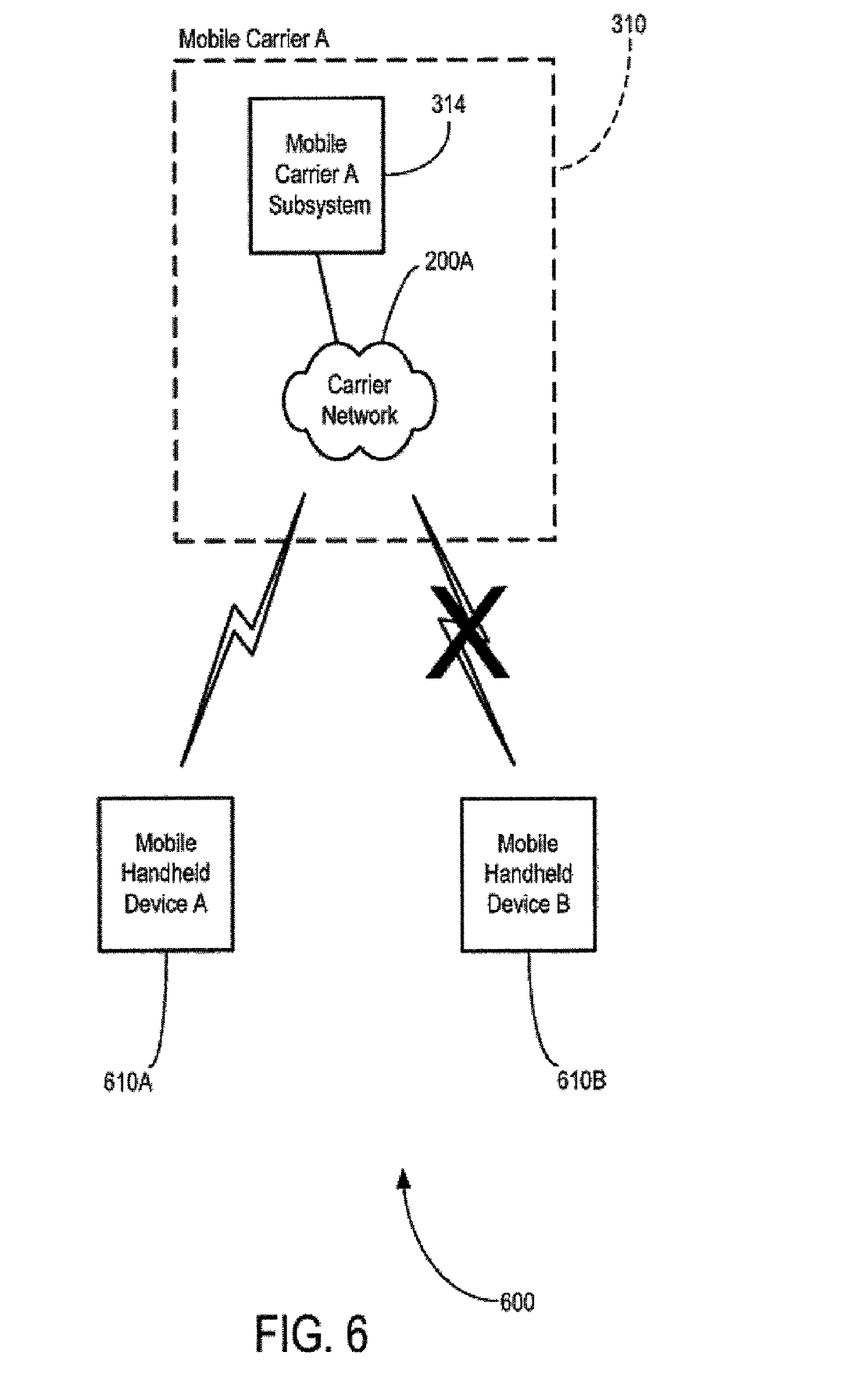
FIG. 6 shows an illustrative example of a device being blocked from a carrier network.

Now referring to FIG. 6, shown is a block diagram 600 of an illustrative example of how a defined unauthorized combination filter 500 may be attached to a carrier to block a group or class of devices from accessing a carrier network. For example, the unauthorized combination filter 500 may be defined and attached to mobile carrier A subsystem 314 such that the device parameters for any device attempting to register on mobile carrier A's network is tested against the device parameter values in the unauthorized combination filter 500.

As shown, a first mobile handheld device 610A and a second mobile handheld device 610B may be provisioned to access the carrier network of mobile carrier A shown at 310. As the first and second mobile handheld devices 610A and 610B each attempt to register through mobile carrier A's carrier network, the device parameter values in the carrier network access module 139 of each device is compared against the device parameter values in the unauthorized combination filter 500 that is attached to a mobile carrier A's subsystem 314.

For example, each of the device type values 402A and 402B may be compared against a number of unauthorized device types as defined in the unauthorized device type field 502, and each of the device OS version values 404A and 404B may be compared against a minimum OS version as defined in the unauthorized device OS version field 504.

In an embodiment, at mobile carrier A's registration and provisioning subsystem 314, if the device's device type, device OS version and device application version match the corresponding unauthorized device type, unauthorized device OS version, and unauthorized device application version fields as defined in the unauthorized combination filter 500, the device will be blocked. Thus, as shown, the first mobile handheld device 610A is successfully registered and is able to access the carrier network 200A for mobile carrier A as there is no complete match. On the other hand, when the second mobile handheld device 610B attempts to register on the carrier network 200A, it is unable to access the carrier network 200A as it is blocked by the defined unauthorized combination filter 500 attached to mobile carrier A's subsystem 314 (i.e. there is a match of the device parameters).

In another embodiment, instead of populating all of the fields of unauthorized combination filter 500, only some of the fields may be populated so that the unauthorized combination filter 500 is less specific (and thus is able to block a larger group or class of devices). As will be appreciated, by defining one or more of the unauthorized device parameters, and by attaching the defined unauthorized combination filter 500 to a carrier subsystem (e.g. mobile carrier A's subsystem 314), a group or class of devices may be blocked from accessing the carrier network, thereby allowing effective network management.

In an embodiment, when a device is unable to access the carrier network 200A, the device ESN (e.g. as may be provided in the carrier network access module 139) may be recorded for device management purposes. Thus, for example, if mobile handheld device 610B is temporarily being blocked from mobile carrier A's carrier network 200A due to an incompatibility with upgraded software on the network, the device user may be notified of the problem and instructed to seek a remedy, such as upgrading the device OS version and/or the device application version, by attaching the device to a computer attached to the Internet. Thus, the device OS version and the device application version may be updated as needed for support by a carrier network. Alternatively, the software on the network may be further updated to improve compatibility with more devices and versions.

Once the reason for blocking a group or class of devices has disappeared, the unauthorized combination filter may be detached from the carrier's registration and provisioning subsystem, such that subsequent attempts to register on the carrier network will be successful.

Figure 7:
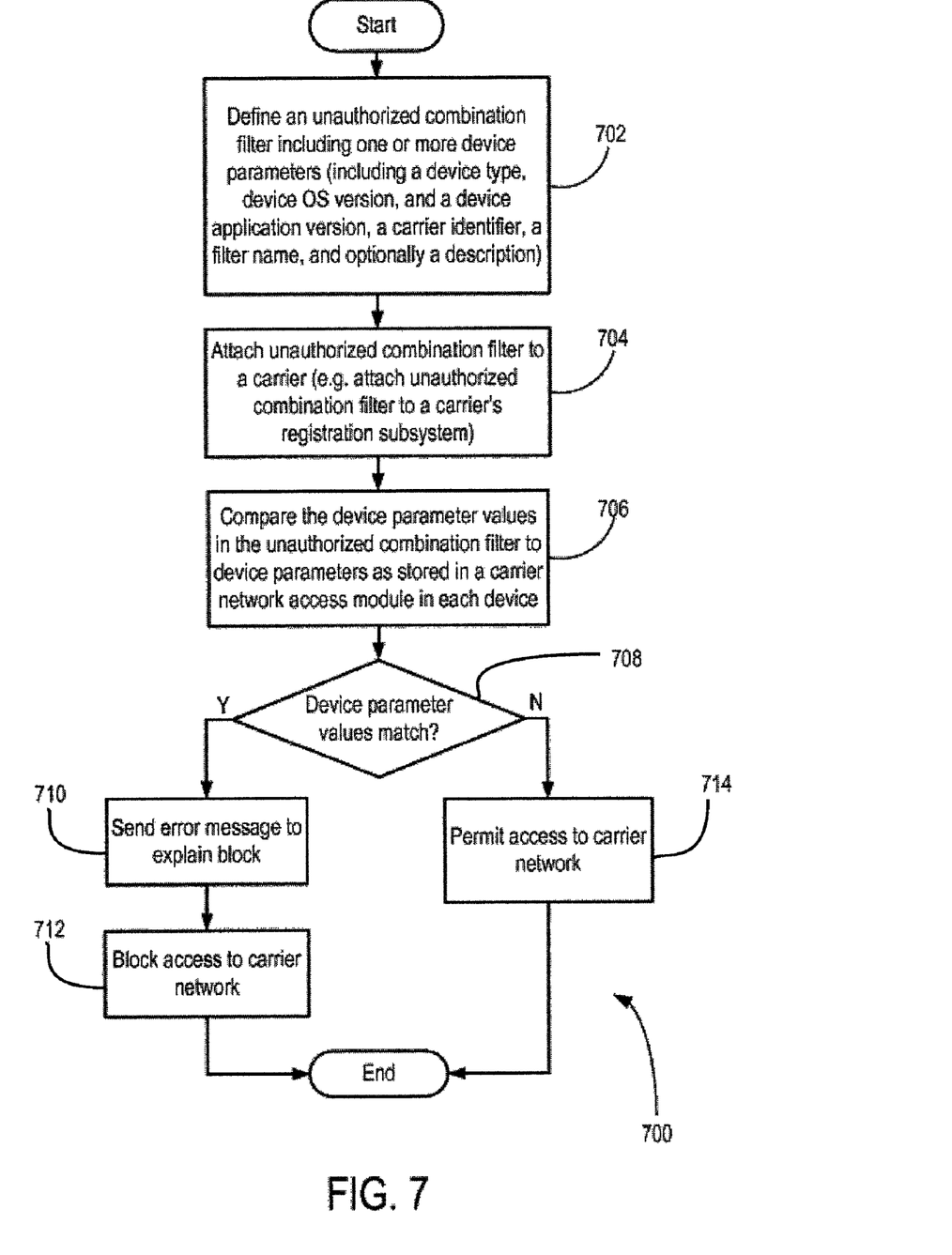
FIG. 7 is an illustrative flowchart of a method in accordance with an embodiment.

Now referring to FIG. 7, shown is an illustrative method 700 for blocking a device from a carrier network corresponding to the system as described above. Method 700 starts at block 702, where method 700 defines an unauthorized combination filter. As described earlier, the unauthorized combination filter may include values for one or more device parameters as defined by an administrator, including a device type, device OS version, a device application version, a carrier identifier, and a unique name for the unauthorized combination filter. Optionally, the unauthorized combination filter may further include a description field for entering a fuller description of the unauthorized combination filter.

Method 700 then proceeds to block 704, where method 700 attaches the unauthorized combination filter to a carrier. By attaching the unauthorized combination filter to a carrier, the blocking function of the unauthorized combination is activated.

Next, method 700 proceeds to block 706, where method 700 compares the device parameter values in the unauthorized combination filter to the device parameter values as stored in a carrier network access module in each device.

Method 700 then proceeds to decision block 708, where method 700 determines if the device parameter values match. If yes, method 700 proceeds to block 710 where method 700 optionally sends an error message to the device to explain why the device is being blocked. Method 700 may then proceed to block 712 to block access to the carrier network and prevent the device from registering. Method 700 then ends.

If at decision block 708 the answer is no, then method 700 proceeds to block 714 where method 700 permits access to the carrier network and allows the device to function normally. Method 700 then ends.

Thus, in an aspect, there is provided a method of blocking a mobile handheld device from a carrier network, comprising: defining an unauthorized combination filter including one or more device parameters; attaching the unauthorized combination filter to a carrier registration subsystem; comparing the device parameter values in the unauthorized combination filter to device parameter values stored in the device; and if the device parameter values stored in the device match the device parameter values in the unauthorized combination filter, then blocking the device from accessing the carrier network.

In an embodiment, the device parameter values stored in the device include one or more of a device type value, a device operating system version value, and a device application version value, and the method further comprises comparing these one or more values to corresponding device parameter values in the unauthorized combination filter.

In another embodiment, the device is blocked from accessing the carrier network if a combination of a device type value, a device operating system version value, and a device application version value is matched.

In another embodiment, the method further comprises sending an error message to the device upon blocking to explain the reason for the block.

In another embodiment, the method further comprises retrieving and storing the ESN or PIN for each blocked device.

In another embodiment, attaching the unauthorized combination filter to a carrier comprises providing a carrier identifier and attaching the unauthorized combination filter to a carrier's registration subsystem.

In another embodiment, the method further comprises detaching the unauthorized combination filter from the carrier registration subsystem; and permitting any previously blocked devices to access the carrier network.

In another aspect, there is provided a system for blocking a mobile handheld device from a carrier network, comprising: processing means adapted to define an unauthorized combination filter including one or more device parameters; processing means adapted to attach the unauthorized combination filter to a carrier registration subsystem; processing means adapted to compare the device parameter values in the unauthorized combination filter to device parameter values stored in the device; and processing means adapted to compare the device parameter values in the device with one or more device parameter values in the unauthorized combination filter, and to block the device from accessing the carrier network if the device parameter values match.

In an embodiment, the device parameter values stored in the device include one or more of a device type value, a device operating system version value, and a device application version value, and the system further comprises processing means adapted to compare these one or more values to corresponding device parameter values in the unauthorized combination filter.

In an embodiment, the device is blocked from accessing the carrier network if a combination of a device type value, a device operating system version value, and a device application version value is matched.

In an embodiment, the system further comprises processing means adapted to send an error message to the device upon blocking to explain the reason for the block.

In another embodiment, the system further comprises processing means adapted to retrieve and storing the ESN or PIN for each blocked device.

In another embodiment, the processing means for attaching the unauthorized combination filter to a carrier comprises processing means adapted to provide a carrier identifier and to attach the unauthorized combination filter to a carrier's registration subsystem.

In another embodiment, the system further comprises: processing means adapted to detach the unauthorized combination filter from the carrier registration subsystem; and processing means adapted to permit any previously blocked devices to access the carrier network.

In another aspect, there is provided a data processor readable medium storing data processor code that when loaded onto a carrier registration subsystem adapts the subsystem to block a mobile handheld device from a carrier network, the data processor readable medium comprising: code for defining an unauthorized combination filter including one or more device parameters; code for attaching the unauthorized combination filter to a carrier registration subsystem; code for comparing the device parameter values in the unauthorized combination filter to device parameter values stored in the device; and code for blocking the device from accessing the carrier network if the device parameter values stored in the device match the device parameter values in the unauthorized combination filter.

In an embodiment, the device parameter values stored in the device include one or more of a device type value, a device operating system version value, and a device application version value, and the data processor readable medium further comprises code for comparing these one or more values to corresponding device parameter values in the unauthorized combination filter.

In another embodiment, the data processor readable medium further comprises code for blocking the device from accessing the carrier network if a combination of a device type value, a device operating system version value, and a device application version value is matched.

In another embodiment, the data processor readable medium further comprises code for sending an error message to the device upon blocking to explain the reason for the block.

In another embodiment, the data processor readable medium further comprises code for retrieving and storing the ESN or PIN for each blocked device.

In another embodiment, the data processor readable medium further comprises code for attaching the unauthorized combination filter to a carrier comprises code for providing a carrier identifier and code for attaching the unauthorized combination filter to a carrier's registration subsystem.

While illustrative embodiments have been described above, it will be appreciated that various changes and modifications may be made. More generally, the scope of the invention is defined by the following claims.

What is claimed is:

1. A method of blocking a mobile handheld device from accessing a carrier network, the method comprising:
   storing an unauthorized combination filter comprising one or more device parameter values, the one or more device parameter values being common to a plurality of mobile handheld devices;
   activating the unauthorized combination filter;
   receiving a registration request from a mobile handheld device, the request comprising device parameter values;
   comparing the device parameter values of the registration request with the device parameter values of the unauthorized combination filter; and
   when the device parameter values of the registration request match the device parameter values of the unauthorized combination filter, blocking the mobile handheld device from accessing the carrier network.

2. The method of claim 1, further comprising:
   when the device parameter values of the registration request do not match the device parameter values of the unauthorized combination filter, allowing the mobile handheld device to access the carrier network.

3. The method of claim 1, wherein the device parameter values of the registration request correspond to values stored in the mobile handheld device.

4. The method of claim 1, wherein the device parameter values of the registration request match the device parameter values of the unauthorized combination filter when each device parameter value of the registration request is equal to the corresponding device parameter value of the unauthorized combination filter.

5. The method of claim 1, wherein storing an unauthorized combination filter comprises:
   providing an interface; and
   receiving, via the interface, the device parameter values for storage.

6. The method of claim 5, where activating the unauthorized combination filter comprises receiving, via the interface, a carrier identifier.

7. The method of claim 1, wherein the device parameter values include one or more of a device type value, a device operating system version value, and a device application version value.

8. The method of claim 1, further comprising:
   subsequent to blocking the mobile handheld device from accessing the carrier network, recording a device identifier, the device identifier comprising one of an electronic serial number ("ESN") and a product identification number ("PIN").

9. The method of claim 8, further comprising:
   sending an error message to the mobile handheld device.

10. The system of claim 8, the subsystem being further configured to:
    send an error message to the mobile handheld device.

11. A system for blocking a mobile handheld device from accessing a carrier network, the system comprising:
    a carrier registration and provisioning subsystem, the subsystem configured to store an unauthorized combination filter comprising one or more device parameter values, the one or more device parameter values being common to a plurality of mobile handheld devices;
    the subsystem further configured to activate the unauthorized combination filter;
    the subsystem further configured to receive a registration request from a mobile handheld device, the request comprising device parameter values;
    the subsystem further configured to compare the device parameter values of the registration request with the device parameter values of the unauthorized combination filter; and
    the subsystem further configured to block the mobile handheld device from accessing the carrier network when the device parameter values of the registration request match the device parameter values of the unauthorized combination filter.

12. The system of claim 11, the subsystem being further configured to allow the mobile handheld device to access the carrier network when the device parameter values of the registration request do not match the device parameter values of the unauthorized combination filter.

13. The system of claim 11, wherein the device parameter values of the registration request correspond to values stored in the mobile handheld device.

14. The system of claim 11, wherein the device parameter values of the registration request match the device parameter values of the unauthorized combination filter when each device parameter value of the registration request is equal to the corresponding device parameter value of the unauthorized combination filter.

15. The system of claim 11, the subsystem being further configured to store an unauthorized combination filter by:
    providing an interface; and
    receiving, via the interface, the device parameter values for storage.

16. The system of claim 15, the subsystem being further configured to activate the unauthorized combination filter by receiving, via the interface, a carrier identifier.

17. The system of claim 11, wherein the device parameter values include one or more of a device type value, a device operating system version value, and a device application version value.

18. The system of claim 1, the subsystem being further configured, subsequent to blocking the mobile handheld device from accessing the carrier network, to record a device identifier, the device identifier comprising one of an electronic serial number ("ESN") and a product identification number ("PIN").

19. A non-transitory computer readable medium storing computer readable code executable by a carrier registration and provisioning subsystem, the computer readable code implementing a method comprising:
    storing an unauthorized combination filter comprising one or more device parameter values, the one or more device parameter values being common to a plurality of mobile handheld devices;
    activating the unauthorized combination filter;
    receiving a registration request from a mobile handheld device, the request comprising device parameter values;
    comparing the device parameter values of the registration request with the device parameter values of the unauthorized combination filter; and
    when the device parameter values of the registration request match the device parameter values of the unauthorized combination filter, blocking the mobile handheld device from accessing the carrier network.

* * * * *